United States Patent
Kantoh et al.

[11] Patent Number: 5,873,596
[45] Date of Patent: Feb. 23, 1999

[54] AIR BAG DEVICE HAVING HORN SWITCH

[75] Inventors: Takanori Kantoh, Nagoya; Ichizou Shiga; Tadashi Yamamoto, both of Aichi-ken; Shinichi Goto, Nagoya, all of Japan

[73] Assignee: Toyoda Gosei Co., Ltd., Aichi-Ken, Japan

[21] Appl. No.: 853,860

[22] Filed: May 9, 1997

[30] Foreign Application Priority Data

| May 10, 1996 | [JP] | Japan | 8-116803 |
| May 10, 1996 | [JP] | Japan | 8-116807 |
| May 10, 1996 | [JP] | Japan | 8-116811 |

[51] Int. Cl.$^6$ ................ B60R 21/16
[52] U.S. Cl. ............ 280/728.2; 280/731
[58] Field of Search ............ 280/728.2, 728.3, 280/731, 732

[56] References Cited

U.S. PATENT DOCUMENTS

| 5,368,327 | 11/1994 | Shiraki et al. | 280/731 |
| 5,371,333 | 12/1994 | Kanai et al. | 280/731 |
| 5,577,766 | 11/1996 | Niwa et al. | 280/731 |
| 5,685,560 | 11/1997 | Sugiyama et al. | 280/731 |
| 5,716,068 | 2/1998 | Sahara et al. | 280/731 |

FOREIGN PATENT DOCUMENTS

| 6-305425 | 11/1994 | Japan . |
| 6-312664 | 11/1994 | Japan . |
| 8-18526 | 2/1996 | Japan . |

*Primary Examiner*—Paul N. Dickson
*Attorney, Agent, or Firm*—Cushman Darby & Cushman IP Group of Pillsbury Madison & Sutro LLP

[57] ABSTRACT

An air bag device 1 is arranged at a steering wheel W. In the air bag device 1, a large door 12 and a planar horn switch 28 can be arranged at a ceiling 10 of a pad 9 with no disadvantage. The air bag device 1 is arranged with a horn switch 28 and a support plate 33 between an air bag 2 and the pad 9. The switch 28 and a support portion 34 of the support plate 33 are constituted in a planar shape substantially equal to that of the openable door 12 of the ceiling 10 of the pad. The support plate 33 is provided with an attaching leg 39 placed along a side wall 17 of the pad. The support plate 33 is attached to a bag holder 19 by the attaching leg 39. Positioning recesses 36 and positioning projections 14 for engaging with each other are formed at the support portion 34 and the door 12. Further, supporting projections 15 for providing a space of predetermined size between the support portion 34 and an inside surface of the door 12 when brought into contact with each other, are formed at the support portion 34 and the door 12.

5 Claims, 13 Drawing Sheets

AIR BAG DEVICE HAVING HORN SWITCH

BACKGROUND OF THE INVENTION (1) Field of the Invention

The present invention relates to an air bag device arranged at an steering wheel, particularly to an air bag device having a horn switch in a flat planar shape.

(2) Description of Related Art

A conventional or known air bag device having a horn switch with a planar shape (flat plate shape) arranged on a steering wheel is disclosed in Japanese Unexamined Patent Publication No. JP-A-6-305425. This air bag device is arranged at an upper portion of a central boss of a steering wheel and includes an air bag, an inflator, a pad and an air bag holder. The inflator supplies a gas for expansion of a folded air bag, the pad covers the folded air bag, and the bag holder holds the air bag, the inflator and the pad.

The air bag device is arranged with a horn switch having a planar shape with a support plate between the folded air bag and the pad. The support plate supports the horn switch from the lower face side and the support plate is also more rigid than the pad.

The pad is provided with a top wall and a side wall. The side wall is provided with a substantially cylindrical shape extending from the outer periphery of the top wall in the downward direction and is held by the bag holder. Two doors, which open in response to the expanding air bag, are arranged in a portion of the top wall surrounded by the side wall. A thin-walled rupture or tear line having an approximately H-like shape, viewed from above, is arranged about and defines the two doors. These doors are arranged on the front side and the rear side of the steering wheel. The doors cover the folded air bag. Further, the support plate supporting the horn switch is attached to the rear or inside face of the door. The attachment utilizes thermal deformation. Specifically, a plurality of stopper projections extending from the doors are first inserted into predetermined holes of the support plate. Then, the exposed distal ends of the stopper projections are expanded out by heat such that the stopper projections do not come off thereby attaching the support plate to the doors.

According to such an air bag device, during expansion of the air bag, the prearranged rupture portion (or tear line) which surrounds the doors of the pad is initally ruptured by a pushing force exerted by the air bag. As a result, the two doors are opened. Successively, the air bag device projects the air bag from openings of the doors whereby the air bag is expanded significantly.

When an attempt is made to improve the the conventional air bag by incorporating a big horn switch with a planar shape, the following structure results. First, a single door is installed on substantially an entire surface of the top wall of the pad which is surrounded by the side wall. Further, the support plate supporting the planar horn switch is attached to the inside surface of the door by utilizing the above-described thermal deformation technique. However, such a structure suffers from the following disadvantage.

When the door is opened upon expansion of the air bag, a tensile force larger than that in the two doors described in the above publication, is exerted on the door. As a result, the door is elongated considerably. Further, an inertia larger than that in the case of the two doors described in the publication, is imparted on the door. However, the support plate is more rigid and less elongated than the pad. Therefore, the portion of the pad where the support plate is attached (thermally-deformed portion) may be destroyed upon expanding the air bag.

Therefore, the top wall of the pad in the conventional air bag device could not be provided with a large door and arranged with a large planar horn switch at the inside surface of the large door.

SUMMARY OF THE INVENTION

It is a first object of the present invention to resolve the above-described problem by providing an air bag device capable of having a large door and a horn switch in a planar shape at a top wall (or ceiling) of a pad without causing destruction thereof.

It is a second object of the present invention to provide an air bag capable of being assembled using fewer steps and at a reduced cost even though it includes a structure wherein a support plate having a planar horn switch attached thereto is held by a bag holder.

Furthermore, it is a third object of the present invention to provide an air bag device capable of preventing leakage of the gas which is used to inflate the air bag, even though the structure of the air bag device includes stopper claws in a retainer, wherein the stopper claws are formed by providing work holes in the retainer and are fixedly engaged with a bag holder via a peripheral edge of an opening in the air bag.

The first object of the present invention can be achieved by an air bag device arranged at a steering wheel and having an air bag, a pad, a bag holder, a horn switch and a support plate as described below.

The air bag is folded and encapsulated within the air bag device. The pad is provided with a top wall and a side wall for covering the air bag when folded.

The side wall is provided with a substantially cylindrical shape extending from the outer periphery of the top wall in a direction which is substantially perpendicular to the ceiling and is held by the bag holder.

The ceiling includes a face and a door which is substantially coextensive with the face. The face is surrounded by the side wall.

The door has an inside surface and a plurality of press projections for pressing the horn switch. The press projections are located on the inside surface of the door. The door is surrounded by a prearranged rupture portion (or tear line).

The door is arranged so as to open when the prearranged rupture portion is ruptured during expansion of the air bag. The bag holder holds the air bag, the pad and the support plate.

The horn switch has a substantially thin plate shape which substantially matches a shape of the door and is arranged between the folded air bag and the pad.

The support plate is arranged between the folded air bag and the pad, is provided with a support portion and an attaching leg, and is more rigid than the pad. The support portion is provided with a planar shape which substantially matches the shape of the door. The horn switch is attached to an outer surface of the support portion to engage and thereby support the horn switch via an inside surface of the horn switch.

The attaching leg extends from the support portion along the side wall of the pad and is attached to the bag holder. Positioning recesses and positioning projections for mutual engagement are formed at the supporting portion of the supporting plate and the door of the pad.

Support projections are formed at the support portion of the support plate and the door of the pad. The support projections, when mutually brought into contact with each other, maintain a predetermined amount of space between the support portion and the inside surface of the door.

According to a first air bag of the present invention, upon expanding the air bag, the door in the top wall of the pad is pushed by the air bag via the support plate and the horn switch. As a result, the air bag ruptures the prearranged rupture portion, opens the door, and is expanded significantly.

In this case, the support portion of the support plate, which carries the horn switch, is not attached to the side of the top wall of the pad which is elongated during rupturing of the prearranged rupture portion. That is, the support plate is attached to the bag holder via the attaching leg. Therefore, the support plate is opened while a portion of the attaching leg serves as a center of rotation without being influenced by elongation of the door or the prearranged rupture portion. As a result, the support plate can be opened without destroying the pad or the like.

Therefore, according to the first air bag device of the present invention, no malfunctions occur when the door is opened by inflation of the air bag, even if a large door is installed on the top wall of the pad and a large horn switch in a planar shape is arranged at the inside surface of the door.

Further, according to the first air bag device of the present invention, the positioning recesses and the positioning projections for mutual engagement are formed at the support portion and the door. Therefore, when the positioning recesses are engaged with the positioning projections, the press projections which are used to actuate the horn switch can be arranged precisely above the planar horn switch. This feature can be achieved without directly attaching the support portion of the support plate to the door. Incidentally, the planar horn switch is preferably constructed of a membrane switch. The membrane switch is constituted by separating two sheets of thin electrode plates with a number of insulating spacers. Therefore, in operating the membrane switch the electrode plates cannot be brought into contact with each other easily, unless a portion of the membrane switch which is shifted from portions where spacers are located, is pressed. As a result, in order to actuate the planar horn switch, the press projection of the door must be arranged precisely above the planar horn switch.

Further, according to the first air bag device of the present invention, the support projections which are brought into mutual contact with each other in order to separate the support portion from the inside surface of the door by a predetermined space, are formed at the support portion and the door. Therefore, when the horn switch is not operated, even if the folded air bag presses the support portion of the support plate toward the door in order to restore the shape of the air bag because the bag resists being tightly folded, erroneous operation of the horn switch can be avoided.

Incidentally, a similar technology is disclosed in Japanese Unexamined Patent Publication No. JP-A-6-312664. This publication shows a device wherein a support plate for supporting a horn switch in a planar shape is connected to a bag holder. However, according to an air bag device described in the publication, the prearranged rupture portion which surrounds the door in the top wall of the pad is not ruptured during expansion of the air bag in the same manner as that of the present invention. Instead, an inner cover per se serving as a support plate during expansion of the air bag is ruptured. Therefore, the inner cover described in the publication needs to have a rigid portion for supporting a horn switch attached thereto, a portion for installing a prearranged rupture portion which is ruptured during expansion of the air bag and a hinge portion for opening the inner cover during expansion of the air bag. As a result, a number of steps are required in selecting the material of the inner cover or setting dimensions thereof to achieve the three functions. According to the present invention, by contrast, the prearranged rupture portion of the support plate may be dispensed with and therefore, conditions imposed on the support plate are diminished, thereby reducing the number of steps required in selecting the material of the support plate and setting the dimensions thereof. Therefore, according to the present invention, the degree of freedom in designing the support plate can be enhanced.

The second object of the present invention can be achieved by an air bag device arranged at a steering wheel and comprising an air bag, a pad, a bag holder, a horn switch and a support plate as described below.

The air bag is folded within the air bag device, and the pad is provided with a top wall and a side wall for covering the folded air bag. The side wall is held by the bag holder and is provided with a substantially cylindrical shape extending from an outer periphery of the top wall in a direction which is substantially perpendicular to the top wall. The side wall further includes a plurality of stopper holes.

The top wall includes a face and a door which is substantially coextensive with the face, the face being surrounded by the side wall. The door is surrounded by a prearranged rupture portion and is also arranged so as to open when the prearranged rupture portion is ruptured by the expanding air bag.

The bag holder is provided with a main body and a hold plate for holding the air bag, the pad and the support plate. The main body is provided with a side wall arranged inside the side wall of the pad.

The side wall is provided with stopper claws for fixedly engaging peripheries of the stopper holes when the stopper claws are inserted into respective ones of the stopper holes in the side wall of the pad. The hold plate includes a region which extends around an outer peripheral surface of the side wall of the pad when the respective stopper claws of the main body are inserted into the respective stopper holes at the side wall of the pad.

The horn switch has a substantially thin plate shape and is arranged between the folded air bag and the pad. The support plate is arranged between the folded air bag and the pad, is provided with a support portion and an attaching leg, and is more rigid than the pad. The horn switch is attached to an outer surface of the support portion. The attaching leg extends from the support portion along the side wall of the pad and includes an expanded portion at a distal end thereof. The attaching leg is arranged between the side wall of the pad and the side wall of the main body of the bag holder and is attached to the bag holder such that the expanded portion projects around an edge of the side wall of the pad or an edge of the side wall of the main body of the bag holder so that the expanded portion serves as a detachment preventive portion.

Therefore, according to the second air bag device of the present invention, the attaching leg of the support plate includes an expanded portion at the distal end of the attaching leg. The attaching leg extends from the support portion which carries the planar horn switch. The support plate is inserted between the side wall of the pad and the side wall of the bag holder. The expanded portion of the attaching leg extends around an edge of the side wall of the pad or the edge of the side wall of the bag holder thereby serving as a detachment preventive portion.

Furthermore, the peripheries of the stopper holes in the side wall of the pad fixedly engage the stopper claws provided at the side wall of the bag holder when the stopper claws are received in the stopper holes of the side wall. The side wall of the pad is held by the hold plate arranged against the outer peripheral surface of the side wall. Therefore, during expansion of the air bag, the side wall of the pad does not expand outwardly to detach from the stopper claws and is solidly held by the bag holder.

As a result, when the door is opened and the support portion of the support plate is opened along with the door in response to the expansion of the air bag, the attaching leg does not become detached from between the side wall of the bag holder and the side wall of the pad, and the support portion of the support plate is smoothly opened with a predetermined portion of the attaching leg serving as a center of rotation.

Therefore, according to the second air bag device of the present invention, attachment of the support plate which carries the planar horn switch, to the bag holder is achieved via the hold plate which attaches the side wall of the pad to the bag holder. There is consequently no need to use rivets when attaching the support plate to the bag holder. The number of steps and costs associated with assembly of the second embodiment are thereby reduced in comparison to conventional arrangements.

Furthermore, the hold plate per se only serves to press the side wall of the pad against the side wall of the bag holder, and therefore, a number of rivets for fixing the inner cover to the bag holder in the conventional case can be reduced or even dispensed with. The hold plate consequently does not diminish the effect of the present invention.

The third object of the present invention can be achieved by an air bag device having an air bag, a retainer, a bag holder, and bottom plate portions as described below.

The air bag is provided with a bag-like shape having an opening for receiving a gas during expansion. The retainer is arranged inside the bag at the periphery of the opening and is provided with a plurality of fixing means and stopper claws.

The fixing means are inserted through the air bag at the periphery of the opening of the air bag and through the bag holder such that the periphery of the opening of the air bag is held between the retainer and the bag holder, whereby the retainer is fixed to the bag holder.

The retainer includes a work hole adjacent to each of the stopper claws, each stopper claw being formed by cutting and raising a piece of the retainer. In addition, each stopper claw is insertable through a periphery of the opening of the air bag and the bag holder.

The bag holder is provided with through holes for receiving the fixing means and stopper recesses, each of the stopper recesses having a periphery which is fixedly engaged by a respective one of the stopper claws when the claws are received in the stopper recesses.

The bottom plate portions are arranged at respective bottoms of the stopper recesses such that the stopper recesses are closed.

According to the third air bag device of the present invention, the bag holder is provided with the through holes for receiving the fixing means and the stopper recesses having peripheries for fixedly engaging the stopper claws when the stopper claws are inserted into the stopper recesses. Further, each of the stopper recesses has a closed bottom.

Therefore, according to the third air bag device of the present invention, even if a gas for expansion is introduced from the opening into the air bag and a portion of the gas for expansion is about to pass the work holes of the retainer, the work holes are closed by the bottom of the stopper recesses in the bag holder. Therefore, leakage of the gas used to expand the air bag is prevented and accordingly, a time period for completing the expansion of the air bag is not prolonged.

Further, when the bag holder is constituted by the main body and a hold plate having a bottom plate capable of holding the side wall of the pad, additional advantageous operations and effects can be achieved. For example, the depth of the bottom plate portions of the hold plate can be made shallower than that in the case of a bag holder comprised of a single member. Such savings in depth will generally correspond to a depth of the stopper holes of the main body. As a result, in forming the bottom plate portions by pressing, the pressing energy can be reduced. Also, the main body and the hold plate can be tightly secured together using the fixing means for holding the air bag. Accordingly, even if the bag holder is constituted by two members, the number of steps required to assemble the air bag device is not increased.

Incidentally, the third air bag device of the present invention can achieve the above-described operation and effect even if the horn switch is not provided.

DESCRIPTION OF THE PREFERRED EMBODIMENTS

Figure 1:
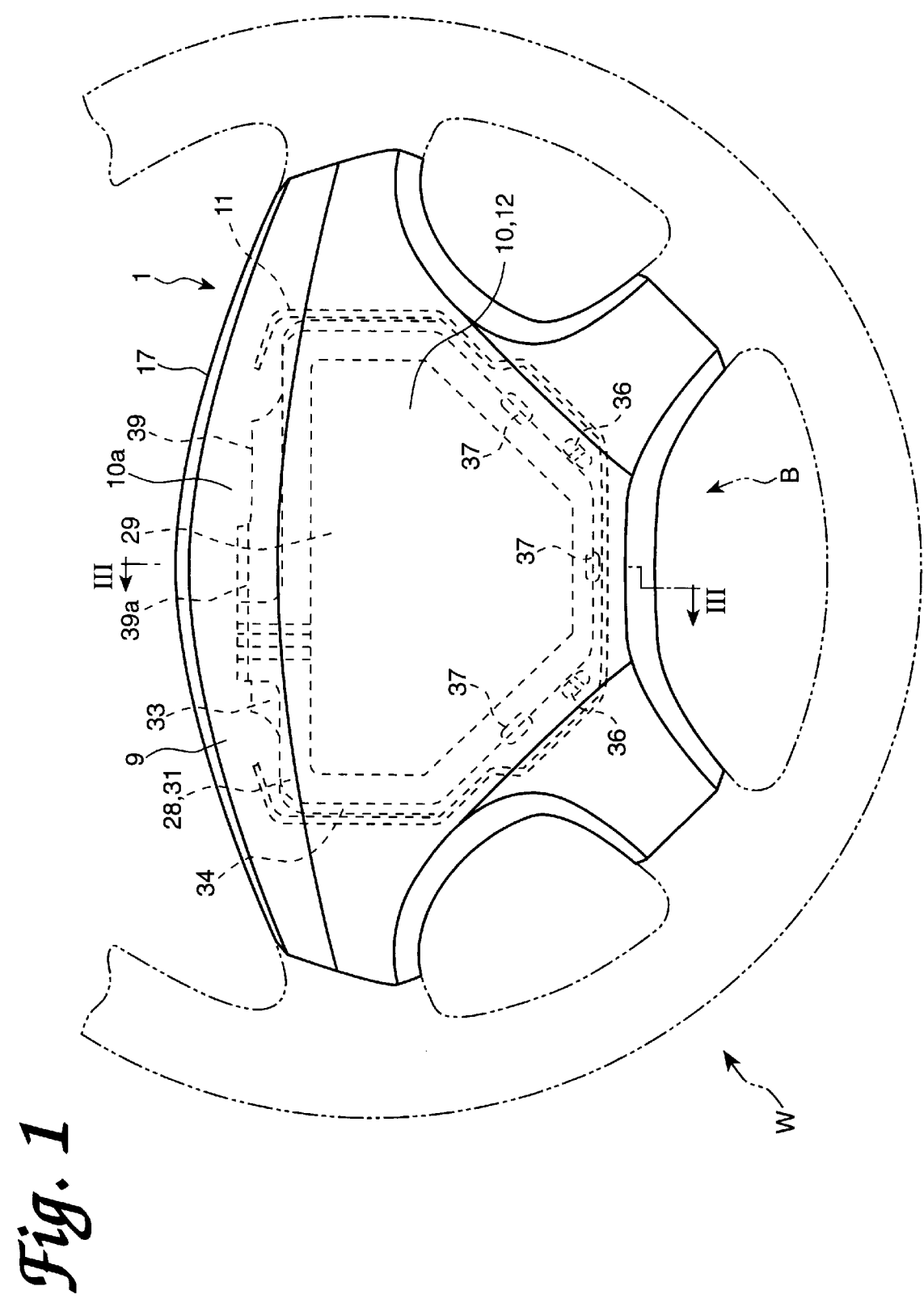
FIG. 1 is a plane view of an air bag device according to an embodiment of the present invention wherein a horn switch and a support plate are shown by the broken lines.

The present invention will now be described with reference to the preferred embodiments illustrated in the drawings. It is understood, however, that the present invention is not limited to the preferred embodiments. In this regard, all modifications to constituent elements of the claims and equivalents of the constituent elements are included within the scope of the claims.

As shown in FIGS. 1 through 4, an air bag device 1 according to a preferred embodiment of the present invention is arranged at the upper portion of a central boss B of a steering wheel W. The air bag device 1 is constituted by an air bag 2, a retainer 3, an inflator 7, a pad 9, a bag holder 19, a horn switch 28 and a support plate 33.

Figure 2:
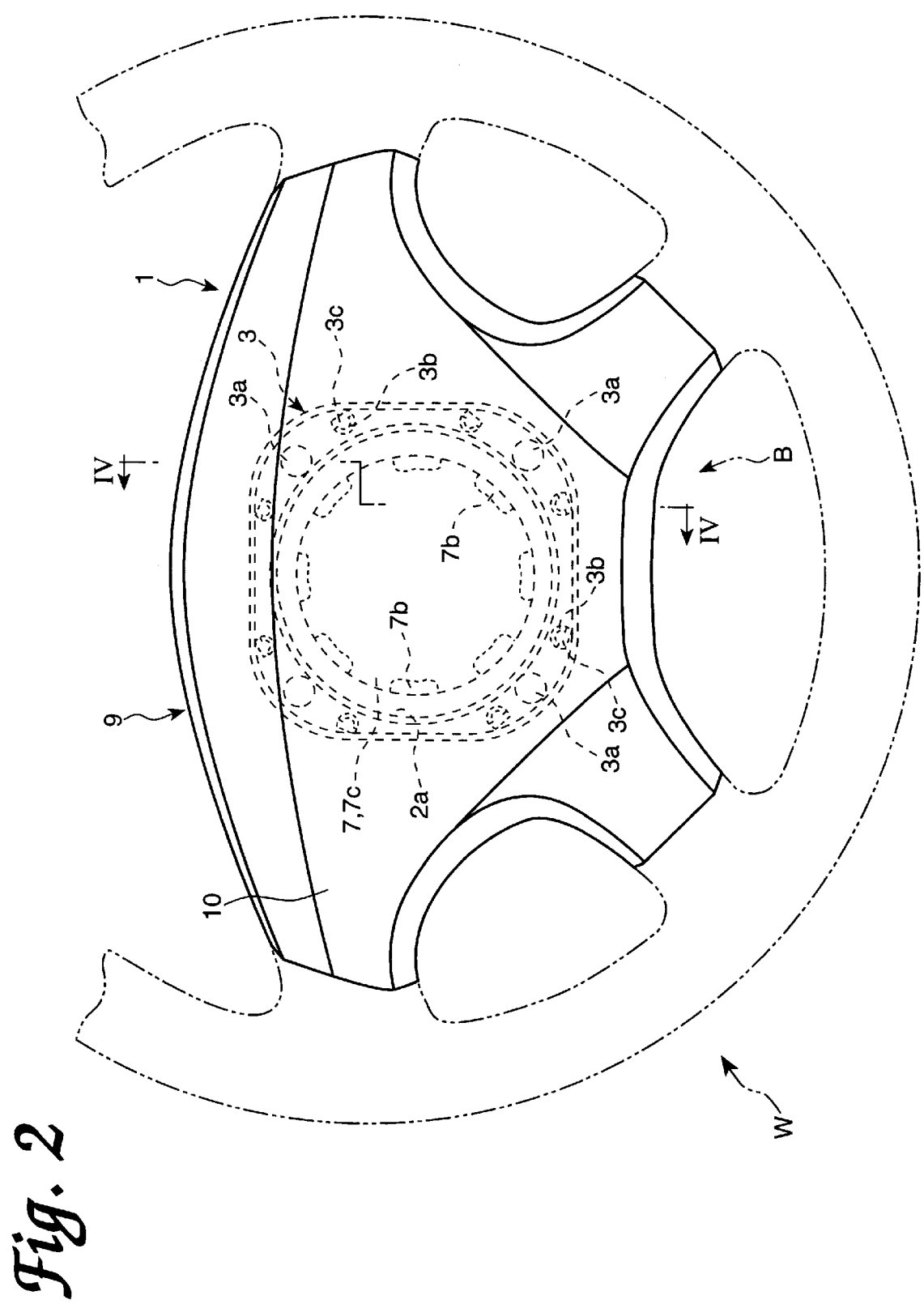
FIG. 2 is a plane view of the air bag device according to the embodiment wherein an inflator and a retainer are shown by the broken lines.
Figure 4:
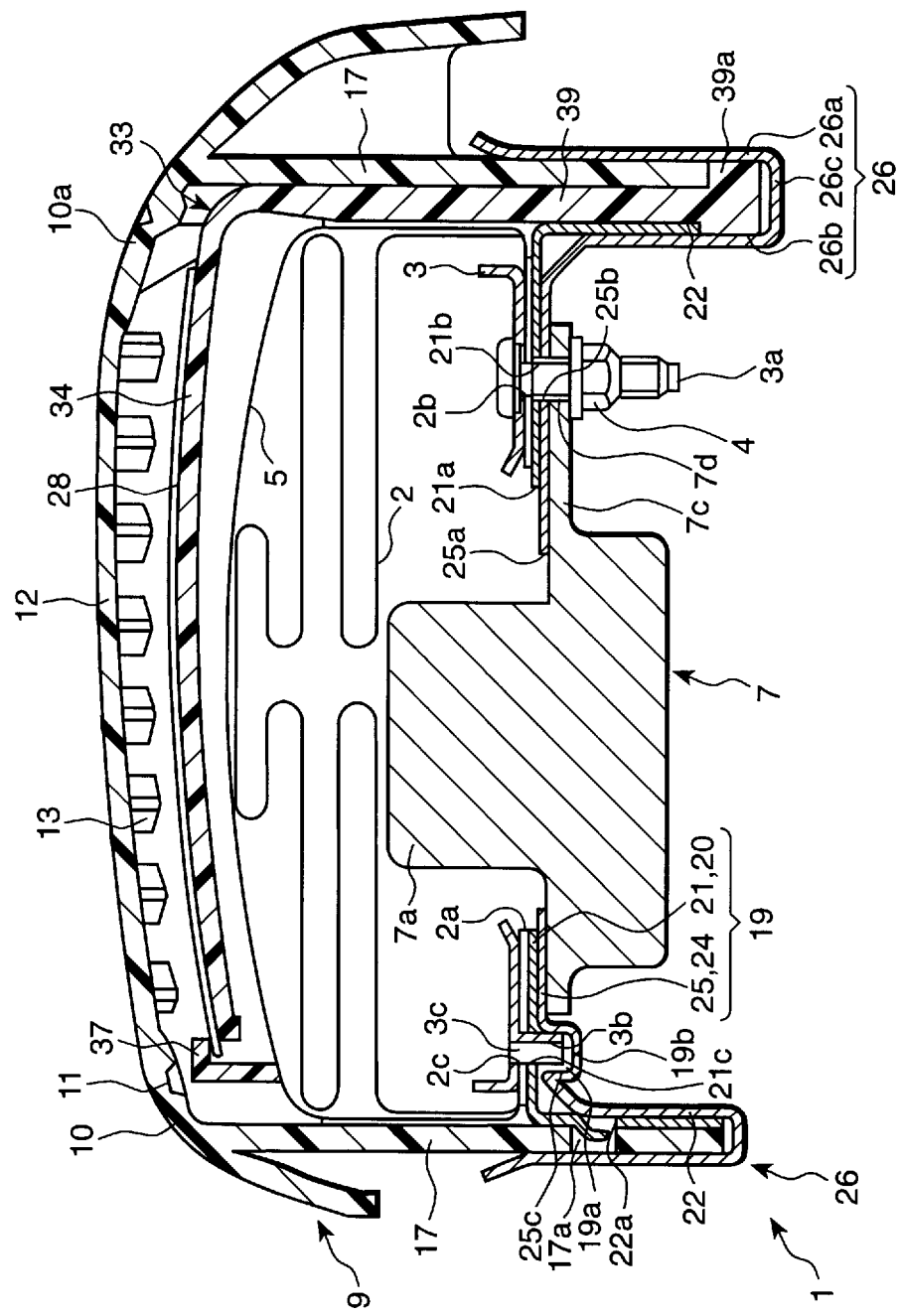
FIG. 4 is a sectional view of the embodiment taken along a line IV—IV of FIG. 2.
Figure 5:
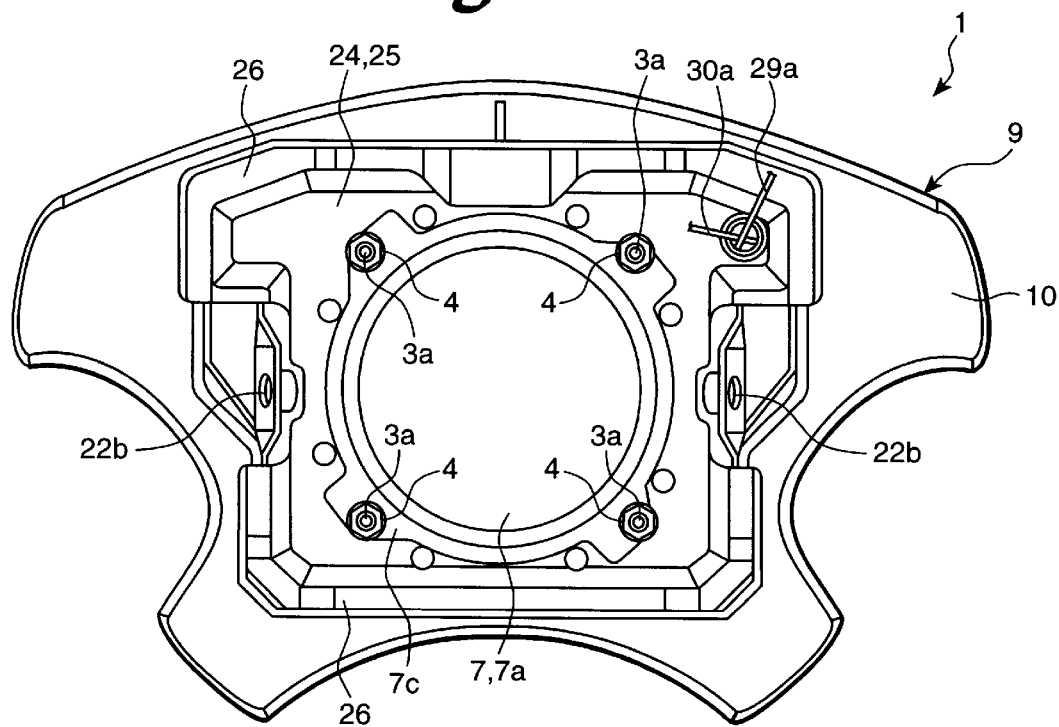
FIG. 5 is a bottom view of the embodiment.
Figure 6:
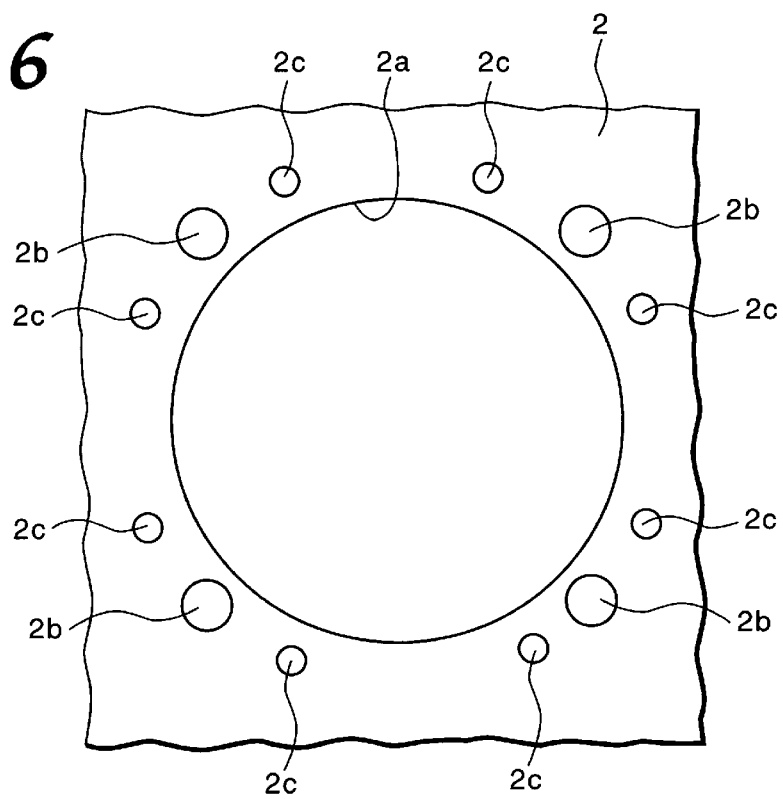
FIG. 6 is a view showing a periphery of an opening of an air bag of the embodiment.
Figure 7:
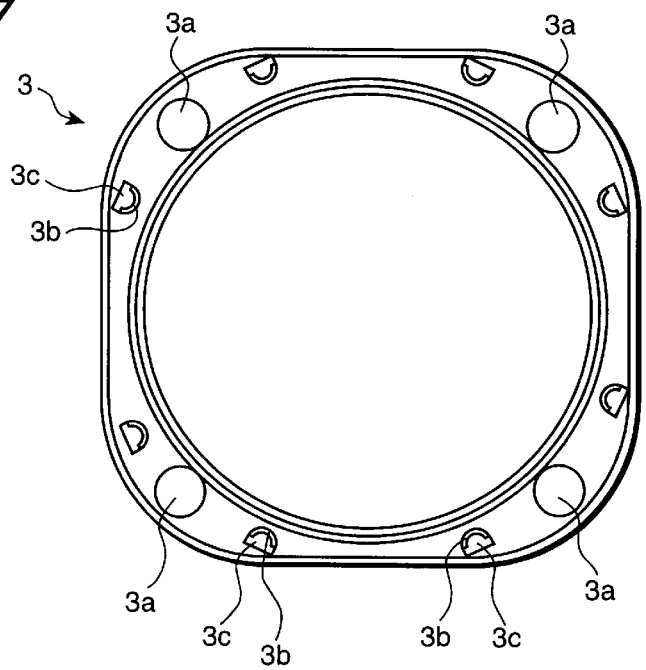
FIG. 7 is a plane view showing a retainer of the embodiment.
Figure 8:
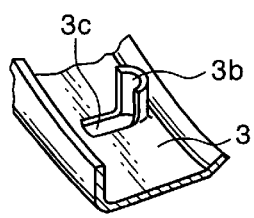
FIG. 8 is a perspective view of a stopper claw viewed from an inside face of the retainer.

The air bag 2 is provided with a substantially spherical bag shape having a circular opening 2a at its lower portion. The air bag 2 is folded and encapsulated in the air bag device 1. As shown by FIGS. 2, 4 and 6, four through holes 2b and eight stopper holes 2c are provided at the periphery of the opening 2a.

As shown by FIGS. 2 through 4, 7 and 8, the retainer 3 is provided with a substantially square ring shape and the inner diameter thereof is equal to an inner diameter of the opening 2a of the air bag 2. Bolts 3a, which act as fixing means, extend downwardly through the retainer 3 and are fixed at four corners of the retainer 3. The retainer 3 is manufactured from a starting plate of suitable size and shape, preferably, using a drawing process. Eight stopper claws 3b are formed between the bolts 3a by cutting the starting plate and raising a cut portion thereof so as to project out from a lower surface of the starting plate. The respective bolts 3a are inserted into the through holes 2b of the air bag 2. The respective stopper claws 3b are inserted into the respective holes 2c of the air bag 2. The respective stopper claws 3b are preferably formed by pressing. The retainer 3 is provided with work holes 3c formed by the pressing operation at the surroundings of the respective stopper claws 3b.

The inflator 7 supplies a gas for expansion to the air bag 2. The inflator 7 is provided with main body 7a and a flange 7c. The main body 7a is provided with a substantially cylindrical shape, and gas discharge ports 7b are arranged at its upper portion. The flange 7c is provided with a substantially square ring shape and projects from the outer periphery of the main body 7a. The upper portion of the main body 7a is provided with an outer diameter which permits insertion of the upper portion into the opening 2a of the air bag 2. The flange 7c is provided with four through holes 7d in correspondence with the respective through holes 2b of the air bag 2. The respective bolts 3a of the retainer 3 are inserted into the through holes 2b of the air bag 2 and the through holes 7d of the flange portion 7c.

The pad 9 is formed by a thermoplastic elastomer from the olefin group or the like. As illustrated by FIGS. 1 through 4 and 9, the pad 9 is provided with a top wall 10 and a side wall 17. The top wall 10 covers the folded air bag 2. The side wall 17 is provided with a substantially squared cylindrical shape extending from an outer peripheral portion of the top wall 10.

A door 12 is arranged at a portion of the top wall 10 surrounded by the side wall 17 and is substantially coextensive with this portion of the top wall 10. The door 12 covers the top portion of the folded air bag 2. Further, a thin-walled prearranged rupture portion 11 is arranged around the periphery of the door 12. The prearranged rupture portion 11 is arranged in a substantially U-like shape in view from above. The door 12 is opened by rupturing the prearranged rupture portion 11 using the expansion force of the air bag 2 when the air bag 2 is inflated. The door 12 is provided with a hinge 10a used in opening the door at a forward position of the pad 9.

Figure 3:
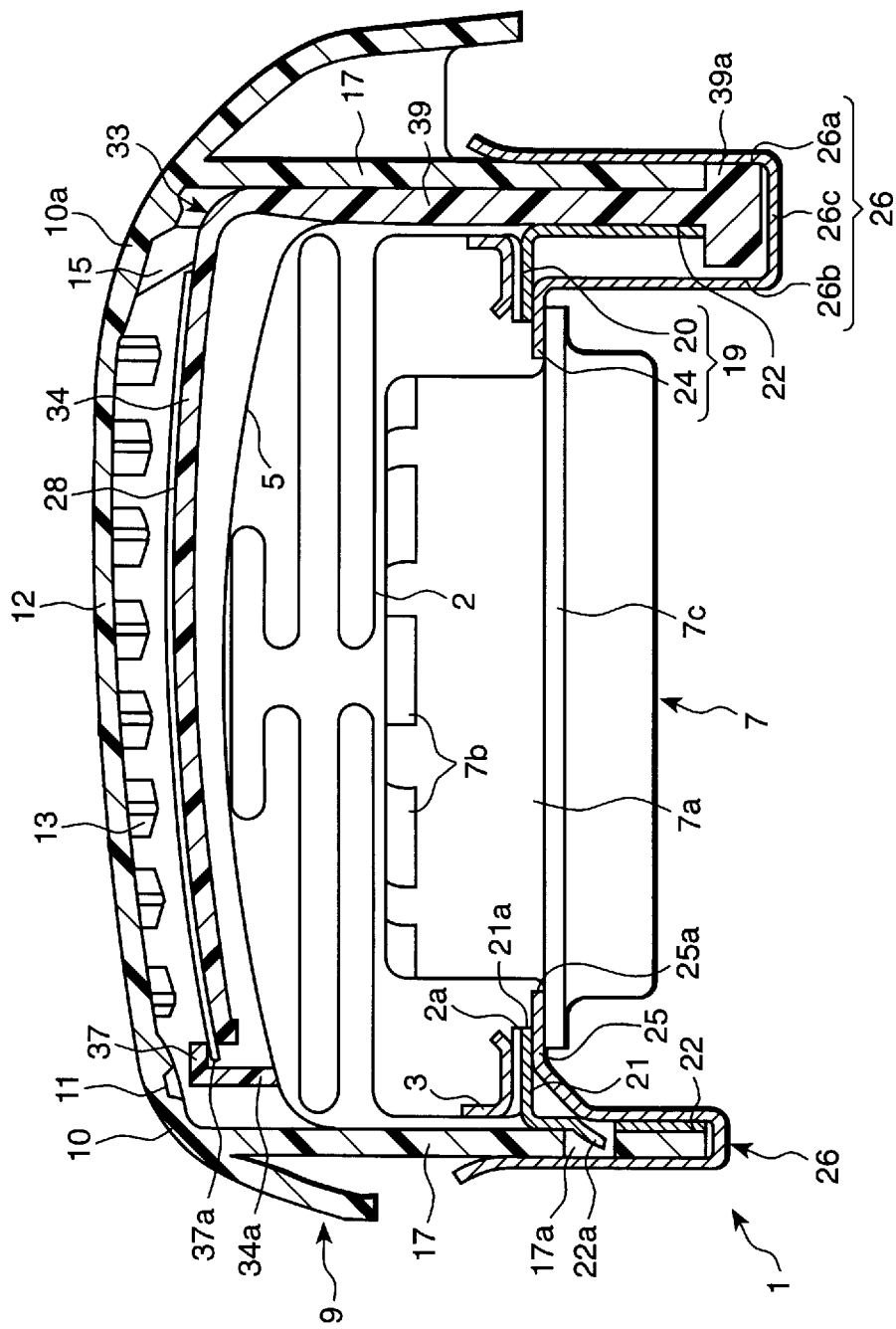
FIG. 3 is a sectional view of the embodiment taken along a line III—III of FIG. 1.
Figure 9:
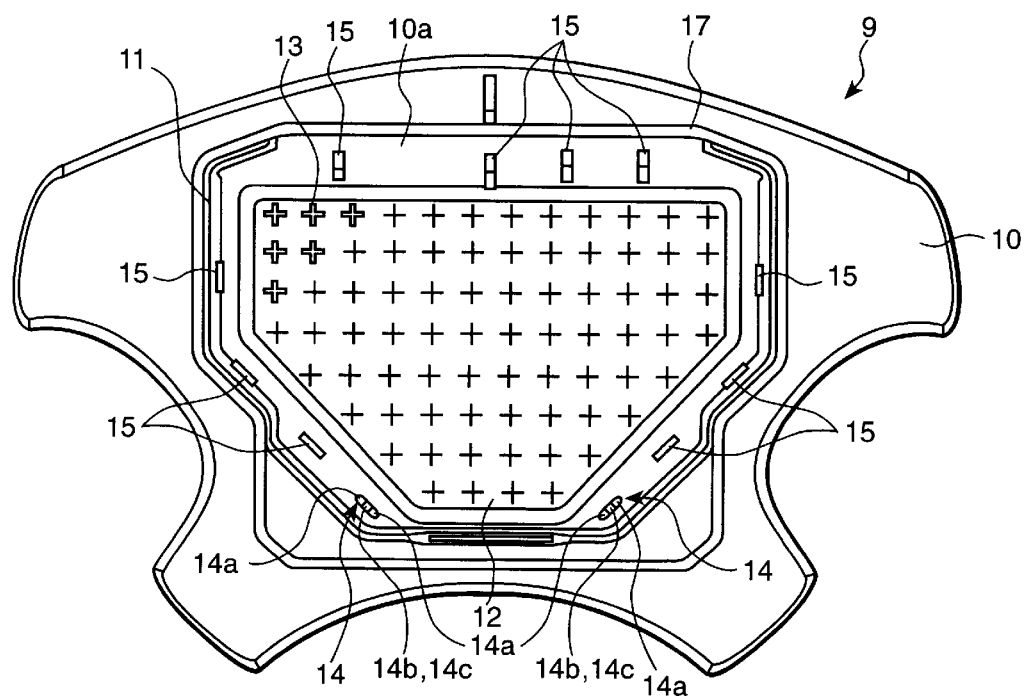
FIG. 9 is a bottom view of a pad of the embodiment.

As shown by FIGS. 3, 4 and 9, a plurality of press projections 13 are formed at predetermined portions on the back face of the door 12. The respective press projections 13 press the horn switch 28 during actuation of the horn switch 28.

Further, positioning projections 14 project from two locations of the inside surface of the door 12 remote from the hinge 10a. Each of the positioning projections 14 comprises two projections 14a and a recess 14b between the projections 14a. The bottom face of the recess 14b constitutes a regulating face 14c. The regulating face 14c is brought into contact with a cross piece 34b of a support portion 34 of the support plate 33, described hereinafter.

A plurality of support projections 15 are arranged at the back face of the door 12 in the vicinity of the prearranged rupture portion 11. The respective support projections 15 can be brought into contact with the region at the outer peripheral edge of the support portion 34 in the support plate 33.

The support projections 15 and the regulating faces 14c are provided for maintaining a predetermined space between the support portion 34 and the back face of the door 12. The predetermined space is provided to prevent unintended actuation of the horn switch 28, as would occur if the respective press projections 13 were brought into contact with the horn switch 28.

The side wall 17 of the pad 9 constitutes a member for connecting the pad 9 to the bag holder 19 while covering the circumferential side portion of the folded air bag 2. The side wall 17 is provided with a plurality of stopper holes 17a at predetermined positions. The stopper holes 17a receive respective stopper claws 22a extending from a side wall 22 of a main body 20, described hereinafter, of the bag holder 19.

As shown by FIGS. 3 and 4, the bag holder 19 is primarily comprised of the main body 20 and a hold plate 24, preferably formed using a drawing process.

As shown by FIGS. 3, 4, 10 and 11, the main body 20 is provided with a bottom wall 21 and a side wall 22. The bottom wall 21 is provided with a substantially square plate shape. The side wall 22 is extended downwardly from the outer peripheral edge of the bottom wall 21 and is substantially coextensive with the outer peripheral edge.

The bottom wall 21 is provided with an insertion hole 21a arranged at the center thereof. The main body 7a of the inflator 7 is inserted into the insertion hole 21a from below. The bottom wall 21 is provided with four through holes 21b and eight stopper holes 21c arranged around the periphery of the insertion hole 21a. The bottom wall 21 is provided with another insertion hole 21d in the vicinity of the side wall 22.

The side wall 22 is formed with stopper claws 22a at predetermined positions. The stopper claws 22a are received in respective stopper holes 17a in the side wall 17 of the pad 9 only when the side wall 17 is appropriately positioned with respect to the side wall 22. This, in turn, provides a stopping effect which facilitates appropriate positioning of the side wall 22 with respect to the side wall 17.

Figure 10:
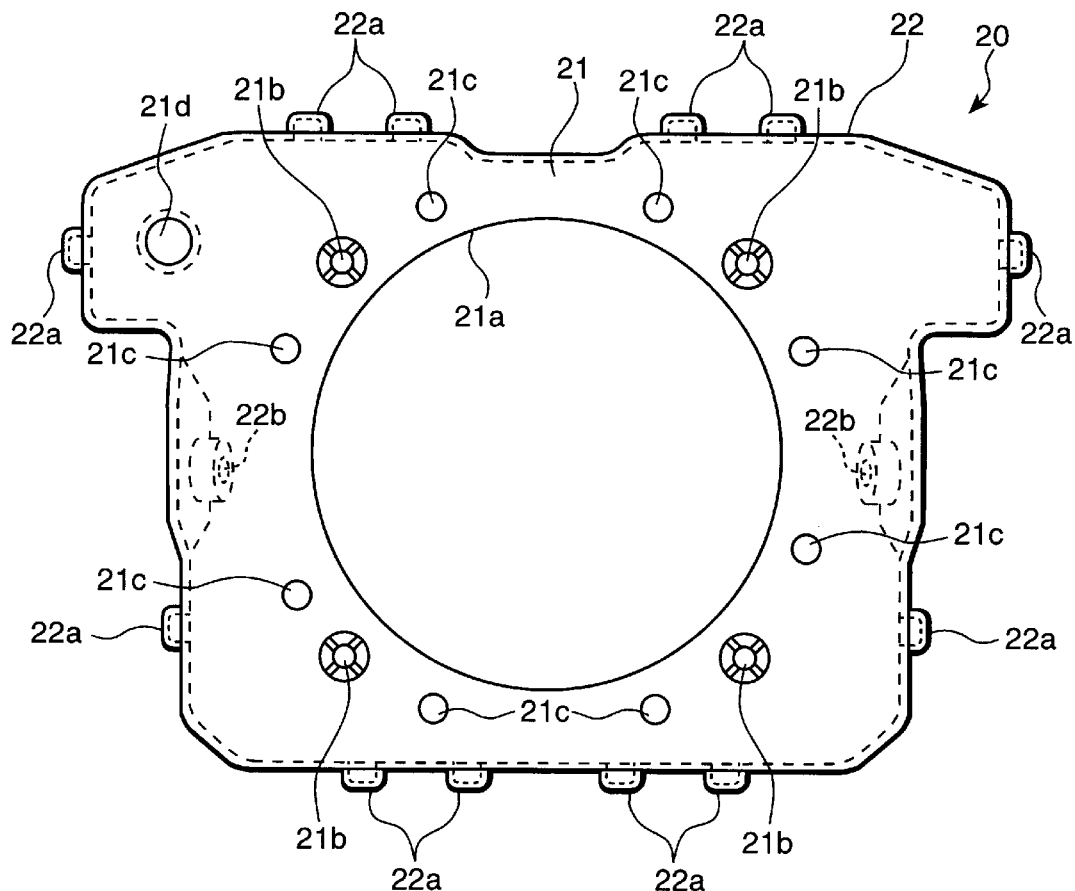
FIG. 10 is a plane view showing a main body of a bag holder of the embodiment.
Figure 11:
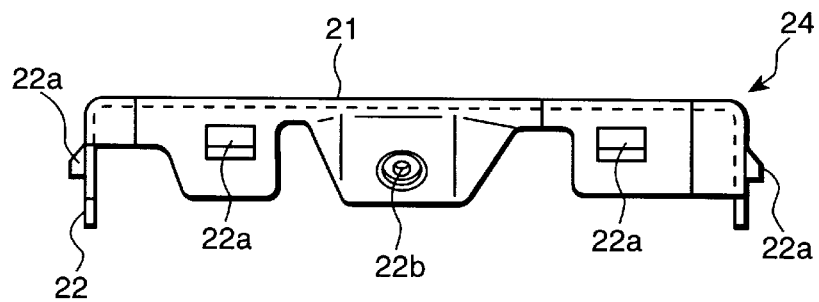
FIG. 11 is a side view showing the main body of the bag holder of the embodiment.
Figure 12:
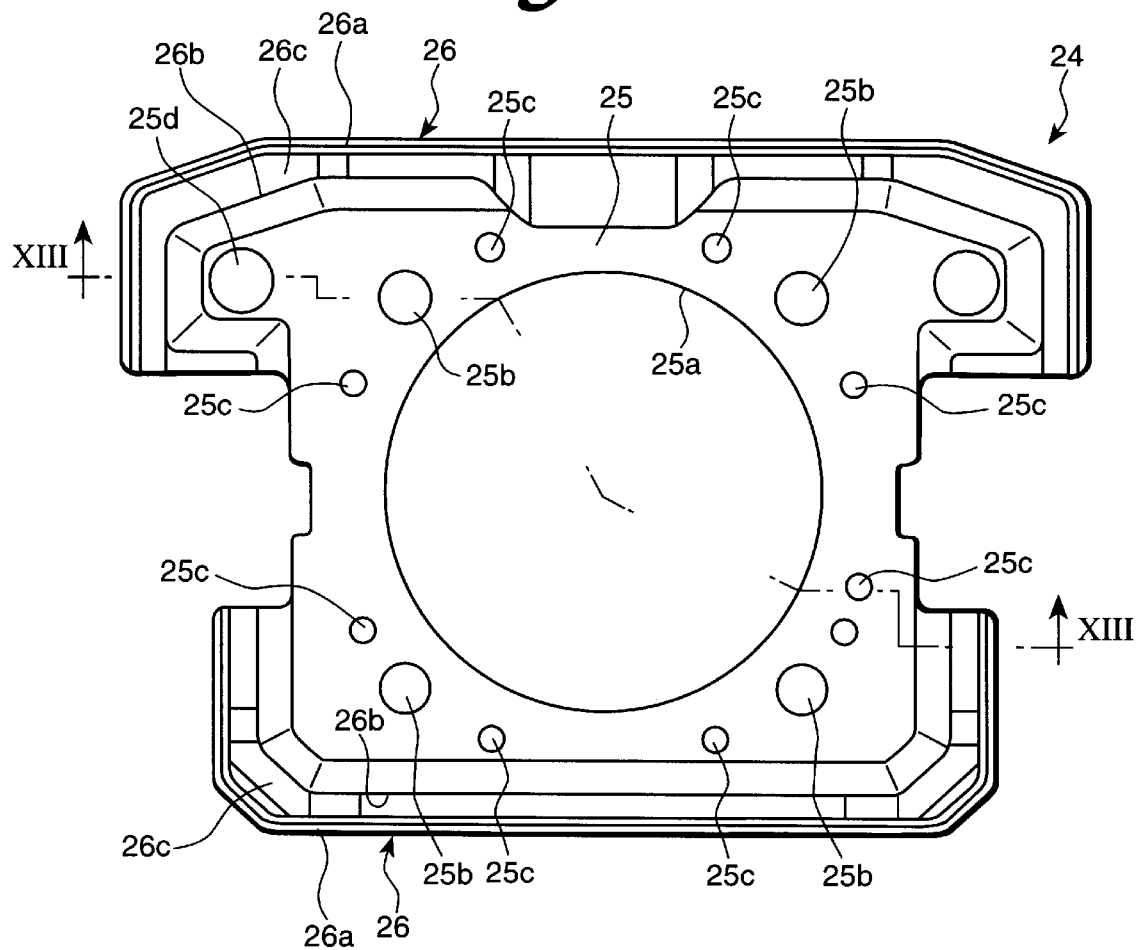
FIG. 12 is a plane view showing a hold plate of the bag holder of the embodiment.
Figure 13:
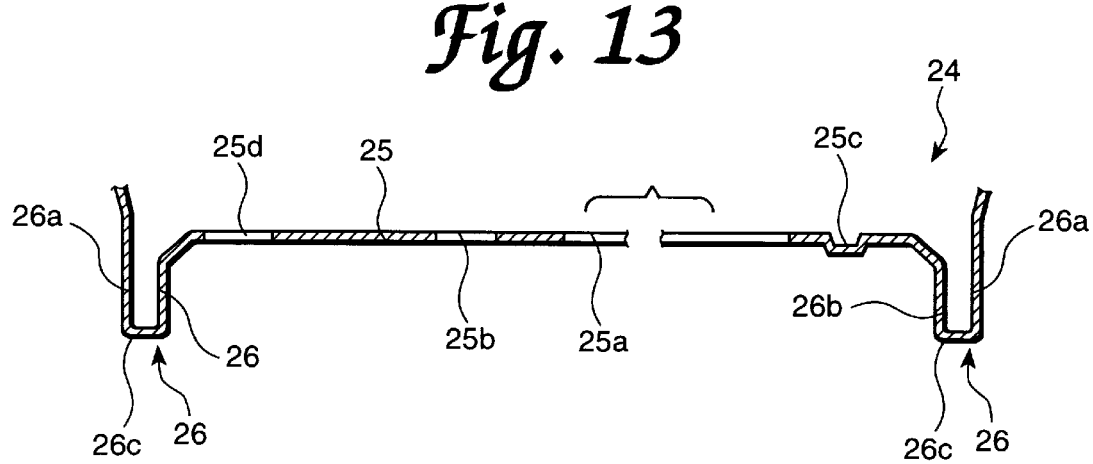
FIG. 13 is a sectional view taken from a line XIII—XIII of FIG. 12.
Figure 14:
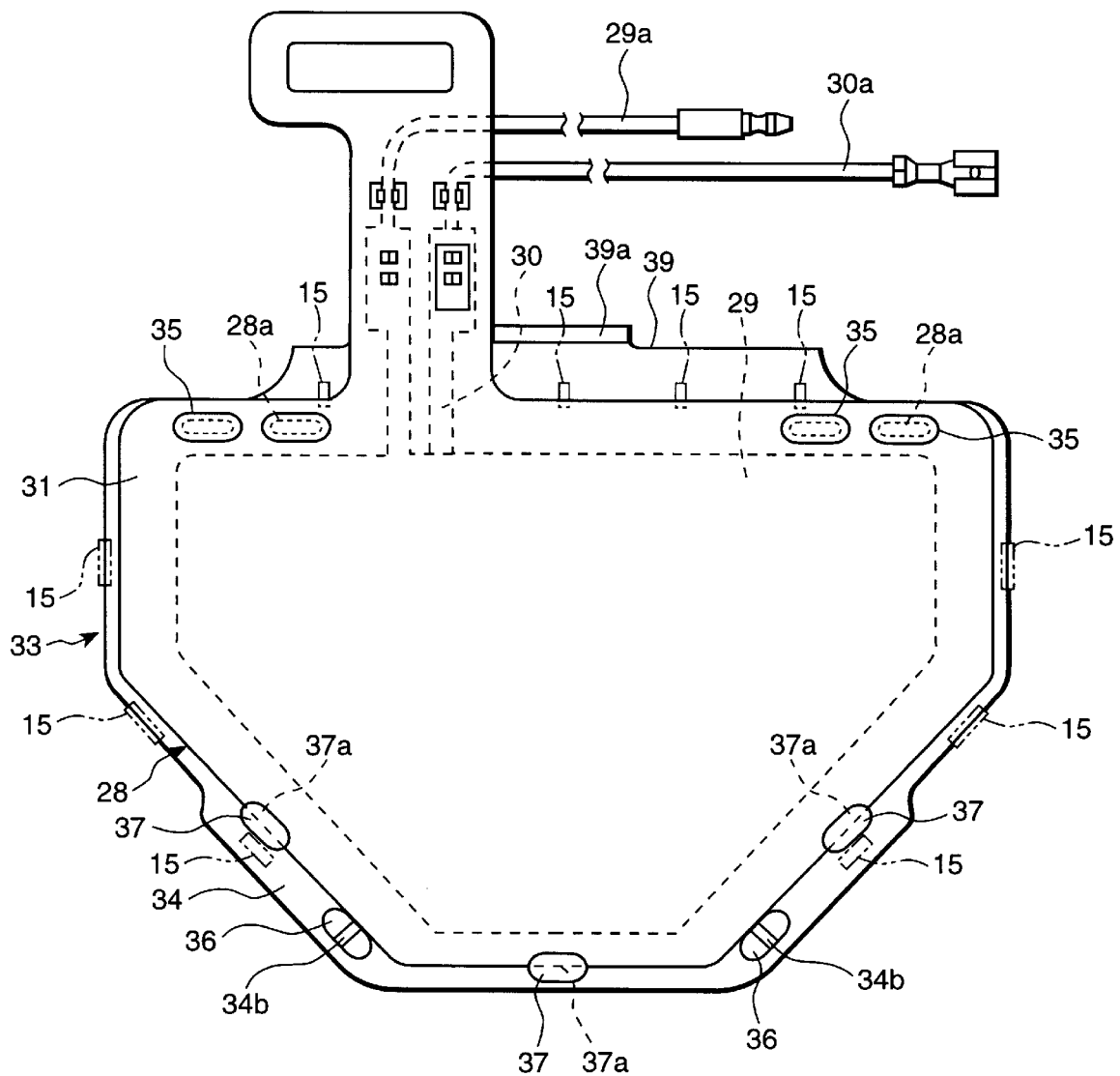
FIG. 14 is a plane view of a support plate arranged with a horn switch of the embodiment.
Figure 15:
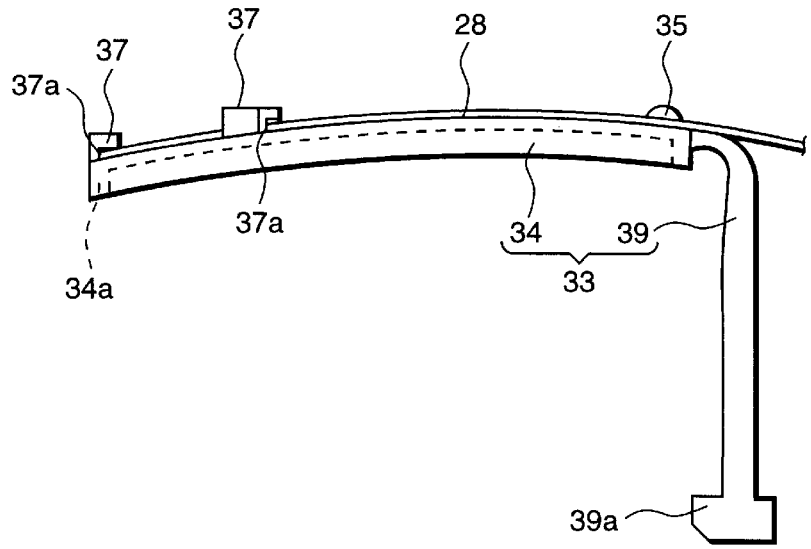
FIG. 15 is a side view of the support plate arranged with the horn switch of the embodiment.

The side wall 22 is provided with two attaching holes 22b. The attaching holes 22b are utilized to attach the air bag device 1 to the steering wheel W. Further, the outer peripheral face of the side wall 22 is brought into contact with substantially the entire inner peripheral face of the side wall 17 in the pad 9 except for a portion which contacts an inner periphery of an attaching leg 39, described hereinafter, of the support plate 33. As shown by FIG. 10, the portion of the side wall 22 which faces the attaching leg 39 of the support plate 33 is recessed inwardly by a distance corresponding to the thickness of the attaching leg 39.

As shown by FIGS. 3, 4, 12 and 13, the hold plate 24 is constituted by a horizontal plate 25 and a fitting portion 26. The horizontal plate 25 is provided with a shape which is substantially the same as that of the bottom wall 21 of the main body 20. The fitting portion 26 extends from the outer peripheral edge of the horizontal plate 25, with a U-like cross-sectional shape. The fitting portion 26 is substantially coextensive with the outer peripheral edge of the horizontal plate 25.

The horizontal plate 25 is provided with a centrally located insertion hole 25a which is aligned with the insertion hole 21a of the bottom wall 21 of the main body 20. The insertion hole 25a receives the main body 7a of the inflator 7 from below, in the same way as the insertion hole 21a of the bottom wall 21. The horizontal plate 25 is provided with four through holes 25b and eight bottomed recesses 25c. The through holes 25b are positioned so as align with respective through holes 21 b of the bottom wall 21. Likewise, the bottomed recesses 25c are positioned so as to align with respective stopper holes 21c of the bottom wall 21. Further, the horizontal plate 25 is provided with an insertion hole 25d at a position corresponding to the insertion hole 21d of the bottom wall 21.

The fitting portion 26 is constituted by an outer peripheral wall 26a, an inner peripheral wall 26b and a connecting wall 26c for connecting the peripheral walls 26a and 26b. The outer peripheral wall 26a is arranged on the side of the outer peripheral face of the side wall 17 of the pad 9. The inner peripheral wall 26b is arranged on the side of the inner peripheral face of the side wall 17 of the pad 9. The outer peripheral wall 26a serves to hold the side wall 17 such that the stopper claws 22a engage the peripheries of the stopper holes 17a and do not become detached from the stopper hole 17a during expansion of the air bag 2.

Incidentally, in the bag holder 19 of the illustrated embodiment, the stopper claws 3b of the retainer 3 engage respective peripheral edges of the stopper holes 21c of the main body 20 and inner peripheral surfaces in the vicinity of upper ends of the recesses 25c in the hold plate 24. The inner peripheral edges of the stopper holes 21c of the main body 20 and the inner peripheral surfaces in the vicinity of the upper ends of the recess portion 25c at the hold plate 24, constitute stopper recesses 19a. The bottom portions of the recesses 25c constitute bottom plate portions 19b which cover the work holes 3c.

As shown by FIGS. 1, 3, 4, 14 and 15, the horn switch 28 is constituted by a large membrane switch having a shape corresponding to the shape of the door 12. In the membrane switch, two sheets of thin electrode plates 29 and 30 are arranged parallel to one another, and are spaced apart via a number of insulating spacers, not shown. Further, according to the preferred membrane switch, protective films 31 cover the electrode plates 29 and 30. Each electrode plate 29 and 30 is provided with a shape that extends to the side of the hinge 10a of the door 12. Leads 29a and 30a are respectively connected to end portions of the electrode plates 29 and 30 adjacent to the hinge 10a. Also, penetrating attaching holes 28a are provided at four locations on the horn switch 28. Each of the attaching holes 28a receives a stopper projection 35 of the support portion 34, described hereinafter, of the support plate 33.

The support plate 33 is made from a synthetic resin of a thermoplastic elastomer from the olefin group, which is more rigid than the pad 9. The support plate 33 is constituted by the support portion 34 and an attaching leg 39. The support portion 34 is arranged for placement at the inside face of the horn switch 28 in order to facilitate mounting of the horn switch 28 to the air bag device 1. The attaching leg 39 extends downwardly from the forward side edge of the support portion 34.

The support portion 34 is formed with an outer shape which is substantially the same as that of the door 12. Ribs 34a for enhancing the rigidity of the support portion 34 are formed at the outer periphery thereof and extend from the inner side of the support portion 34. Stopper projections 35 and attaching projections 37 are formed at the outer peripheral edge of the support portion 34, on the outside facing side thereof. Four stopper projections 35 are arranged at the edge of the support portion 34 which connects to the attaching leg 39. Three of the attaching projections 37 are arranged at the edge of the support portion 34 and extending out beyond an outside surface thereof. Further, the support portion 34 is provided with two positioning recesses 36, each constituting a through hole with an interposed cross piece 34b on the edge of the support portion 34.

The stopper projections 35 are thermally deformed to attach the horn switch 28 of the support portion 34. That is, the stopper projections 35 are inserted into the attaching holes 28a and the distal ends thereof are heated until they become molten. The distal ends are then expanded by deformation to secure the horn switch 28 to the support portion 34.

The projections 14a of the positioning projections 14 on the door 12 of the pad 9, are inserted into the respective positioning recesses 36. Further, by inserting the projections 14a into the respective positioning recesses 36, the press projections 13 of the door 12 are precisely aligned with locations on the horn switch 28 which are free of insulative spacers, not shown. Such alignment permits actuation of the press projections toward the horn switch 28 to activate the horn switch 28.

Each of the attaching projections 37 is provided with a recessed groove 37a at the inner side of its root so that the outer peripheral edges of the horn switch 28 may be received in the recessed grooves 37a.

A bidirectionally expanded portion 39a is formed at the lower edge of the attaching leg 39. Detachment of the expanded portion 39a is prevented by the side wall 22 of the main body 20 and the side wall 17 of the pad 9. As a result, the expanded portion 39a constitutes a member capable of attaching the support plate 33 to the bag holder 19. Incidentally, the side wall 17 of the pad 9 is held by the outer peripheral wall 26a of the fitting portion 26 of the hold plate 24.

A preferred method of assembling the air bag device 1 will now be described. First, the retainer 3 is arranged inside the air bag 2. Then, the bolts 3a of the retainer 3 are inserted through the respective through holes 2b at the periphery of the opening 2a, and the stopper claws 3b of the retainer 3 are inserted through the respective stopper holes 2c at the periphery of the opening 2. Next, the air bag 2 is folded. Incidentally, in order to prevent irregular folding, a destructible strap 5 (as shown in FIG. 3 and FIG. 4) is engaged with the bolts 3a of the retainer 3 to wrap up the folded air bag 2.

Further, the horn switch 28 is attached to the upper face of the support portion 34 of the support plate 33. In this attaching operation, outer peripheral edges of the horn switch 28 are inserted into the recessed grooves 37a of the attaching projections 37. The stopper projections 35 are inserted into the respective attaching holes 28a and the distal ends thereof are thermally deformed by heating and expansion thereof.

Next, the support portion 34 of the support plate 33 having the horn switch 28 attached thereto is arranged on the inside facing surface of the door 12 of the pad 9. The positioning projections 14 are inserted into the respective positioning recesses 36 and the attaching leg 39 of the support plate 33 is placed along the inner peripheral surface of the side wall 17 of the pad 9. The expanded portion 39a is arranged against the lower edge of the side wall 17.

Thereafter, the bolts 3a of the retainer 3 are inserted into the respective through holes 21b of the main body 20 of the bag holder 19, and the stopper claws 3b of the retainer 3 are inserted into respective stopper holes 21c of the main body 20 of the bag holder 19. The folded air bag 2 is thereby arranged on the bottom wall 21 of the main body 20 of the bag holder 19. Next, the pad 9, in combination with the support plate 33, is brought toward the air bag 2 such that the pad 9 covers the air bag 2 and the stopper claws 22a of the side wall 22 of the main body of the bag holder 19 are received in the respective stopper holes 17a of the side wall 17 of the pad 9. The peripheries of the stopper holes 17a are thus engaged by the respective stopper claws 22a. Incidentally, at this moment, the expanded portion 39a at the lower end of the attaching leg 39 of the support plate 33 is arranged against the lower edge of the side wall 22. Further, the leads 29a and 30a from the horn switch 28 are fed through the insertion hole 21d formed at the bottom wall 21 of the main body 20 of the bag holder 19.

Next, the fitting portion 26 of the hold plate 24 of the bag holder 19 is arranged so as to cover the side wall 17 of the pad 9 and the side wall 22 of the main body 20 of the bag holder 19. Further, the bolts 3a of the retainer 3 are inserted into the respective through holes 25b of the hold plate 24, and the stopper claws 3b of the retainer 3 are inserted into the respective recesses 25c of the hold plate 24 such that the hold plate 24 is arranged on the lower face side of the main body 20. Incidentally, the leads 29a and 30a of the horn switch 28 are fed through the through hole 25d formed in the horizontal plate 25a of the hold plate 24.

Next, the main body 7a of the inflator 7 is inserted into the insertion holes 25a and 21a and the bolts 3a extending from the retainer 3 are inserted into the through holes 7d of the flange 7c or the inflator 7. Next, nuts 4 are threaded onto the respective bolts 3a by which the air bag device 1 is maintained in an assembled state.

Incidentally, after assembling the air bag device 1, the support portion 34 of the support plate 33 is brought into contact with the door 12 of the pad 9 such that the folded air bag 2 is restored. However, the support projections 15 have been formed at the top wall 10 of the pad 9 to maintain a predetermined space between the press projections 13 of the door 12 and the horn switch 28.

Thereafter, the attaching holes 22b located in the side wall 22 of the main body 20 of the bag holder 19 can be used to mount the air bag device 1 to the steering wheel W. Incidentally, the leads 29a and 30a are connected to a predetermined horn switch operating circuit.

Figure 16:
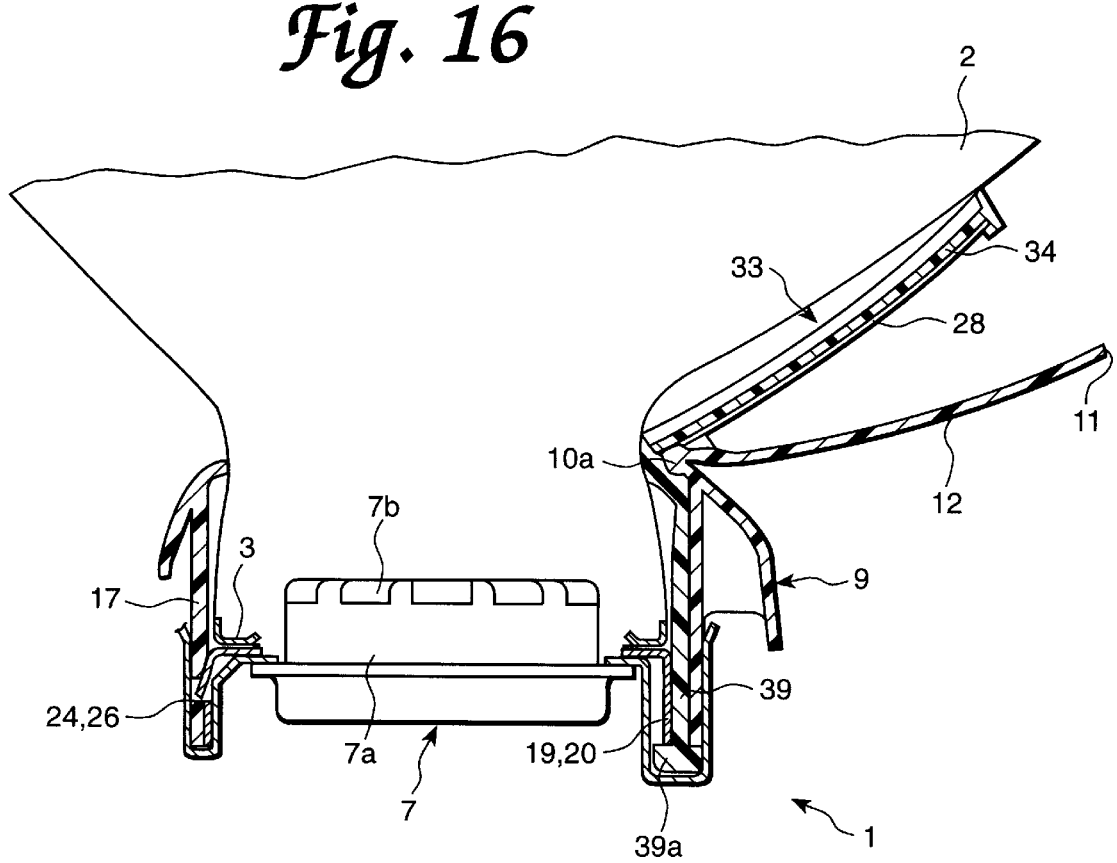
FIG. 16 is an outline sectional view showing an expanded state of the air bag of the embodiment.

After mounting the air bag device 1 to the steering wheel W, when the gas is discharged from the gas discharge ports 7b of the inflator 7, the air bag 2 starts expanding. During expansion, the door 12 of the top wall 10 of the pad 9 is pushed by the air bag 2 via the support portion 34 of the support plate 33 and the horn switch 28. Then, as shown by FIG. 16, the prearranged rupture portion 11 is destroyed, thereby permitting the door 12 to open, with the hinge 10a serving as a center of rotation. The air bag 2 is thus able to expand significantly through the resulting opening.

At this moment, the support portion 34 of the support plate 33 which remains attached to the horn switch 28, is not attached to the door 12 of the top wall 10 of the pad 9 which became elongated during destruction of the prearranged rupture portion 11. The support portion 34 remains attached to the side wall 22 of the main body 20 of the bag holder 19 and the outer peripheral wall 26a of the hold plate 24 via the attaching leg 39. Accordingly, the support portion 34 is opened, while the top portion of the attaching leg 39 serves as a center of rotation, without being influenced by the elongation of the door 12 and the prearranged rupture portion 11 of the top wall 10 of the pad 9. Accordingly, the support portion 34 is opened without destroying the pad 9 or the like.

Therefore, with respect to the air bag device 1 of the preferred embodiment, even if the large door 12 is installed on the top wall 10 of the pad 9 and a horn switch 28 having a planar shape is arranged at the inward facing side of the door 12, the door 12 can be opened with little resistance during expansion of the air bag 2.

Further, according to the air bag device 1 of the preferred embodiment, the plurality of positioning recesses 36 and positioning projections 14 for mutual engagement are formed at the support portion 34 of the support plate 33 and the door 12 of the pad 9. Therefore, when the positioning projections 14 are engaged with the positioning recesses 36, the press projections 13 used to actuate the horn switch 28 during activation of the horn switch 28, are precisely aligned above the planar horn switch 28. As a result of such precise alignment, when the door 12 of the pad 9 is pressed prior to expansion of the air bag 2, the press projections 13 in the vicinity of a pressed portion are precisely brought into contact with a portion of the electrode plate 29 and the electrode plate 30 where there are no spacers. The horn thus can be operated easily even if the support portion 34 at the support plate 33 attached to the horn switch 28 is not directly attached to the door 12.

Further, the support projections 15, the regulating faces 14c and the cross pieces 34b are formed at the support portion 34 and the door 12 such that they are brought into contact with each other to provide a space of predetermined size between the support portion 34 and the inside surface of the door 12. Therefore, when the horn switch 28 is not being operated, the projections 13 do not press the horn switch 28, and even if the support portion 34 of the support plate 33 is pressed toward the door 12 such that the folded air bag 2 is restored, erroneous operation of the horn switch 28 can be prevented.

Incidentally, although the illustrated embodiment utilizes the stopper projections 35 and the stopper projections 37 as a structure for attaching the horn switch 28 to the support portion 34 of the support plate 33, it is understood that the entire horn switch 28 may be attached to the support plate by utilizing thermal deformation such that even the portions of the stopper projections 37 are thermally deformed. Alternatively, the horn switch 28 may be attached to the support portion 34 without utilizing the thermal deformation by providing the recessed grooves 37a at portions of the stopper projections 35. Furthermore, the horn switch 28 may be screwed to the support portion 34.

Further, although the illustrated embodiment includes the positioning projections 14 installed on the inside surface of the door 12 and positioning recesses 36 installed at the edge of the support portion 34 of the support plate 33, it is understood that the location of such elements may be reversed such that the positioning recesses are provided on the inside surface of the door 12 and the positioning projections are provided at the edge of the support portion 34. Likewise, the present invention can include a combination wherein both projections and recesses are located on each of the door 12 and the support portion 34.

Further, although the illustrated embodiment prevents inadvertent actuation of the horn switch 28 by providing the support projections 15 on the inside surface of the door 12 such that they are brought into contact with the support portion 34 of the support plate 33, it is understood that, if the horn switch 28 is not operated except at a predetermined time, the support projections may be provided on the side of the support portion 34, or at both of the door 12 and the support portion 34.

Furthermore, according to the illustrated embodiment, the attaching leg 39 of the support plate 33 is attached to the bag holder 19 such that the expanded portion 39a of the attaching leg 39 is prevented from becoming detached by the side wall 22 of the main body 20 and the outer peripheral wall 26a associated with the hold plate 24 constituting the bag holder 19. Furthermore, the attaching leg 39 of the support plate 33 is attached to the bag holder 19 without utilizing rivets but rather by utilizing the bolts 3a of the retainer 3 to attach the air bag 2 and the inflator 7 to the bag holder 19. Therefore, the number of steps required in assembling the air bag device 1 and assembly costs can be significantly reduced.

Figure 17:
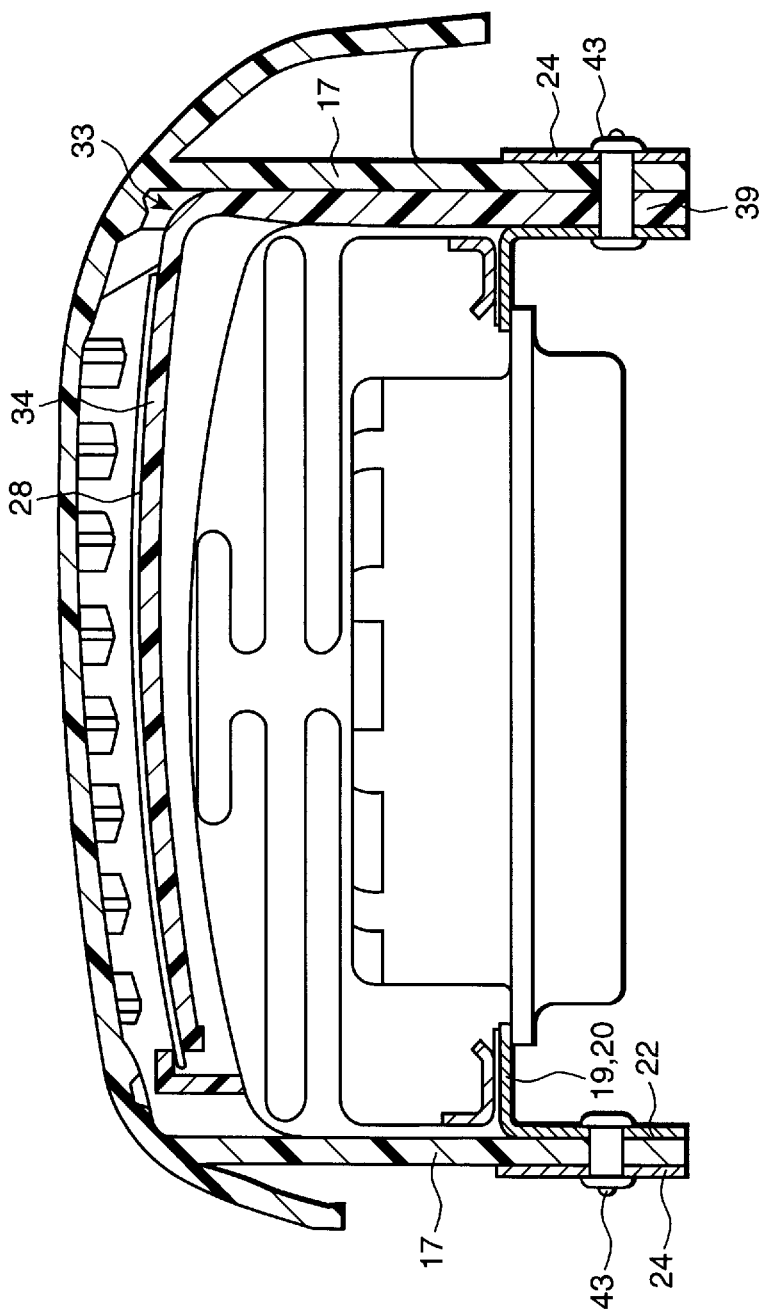
FIG. 17 is a sectional view of another embodiment.

Incidentally, if the hold plate 24 is not fixed by the bolts 3a of the retainer 3 as in the illustrated embodiment, and as illustrated by FIG. 17, the hold plate 24 is instead integrated into the main body 20 of the bag holder by rivets 43 arranged to penetrate the side wall 22 of the main body 20 and the side wall 17 of the pad 9, the expanded portion 39a may be dispensed with and the attaching leg 39 may be attached to the bag holder 19 by utilizing the rivets 43. Also in this case, the operation and effect of the air bag device illustrated in FIGS. 1–16 can be obtained.

Figure 18:
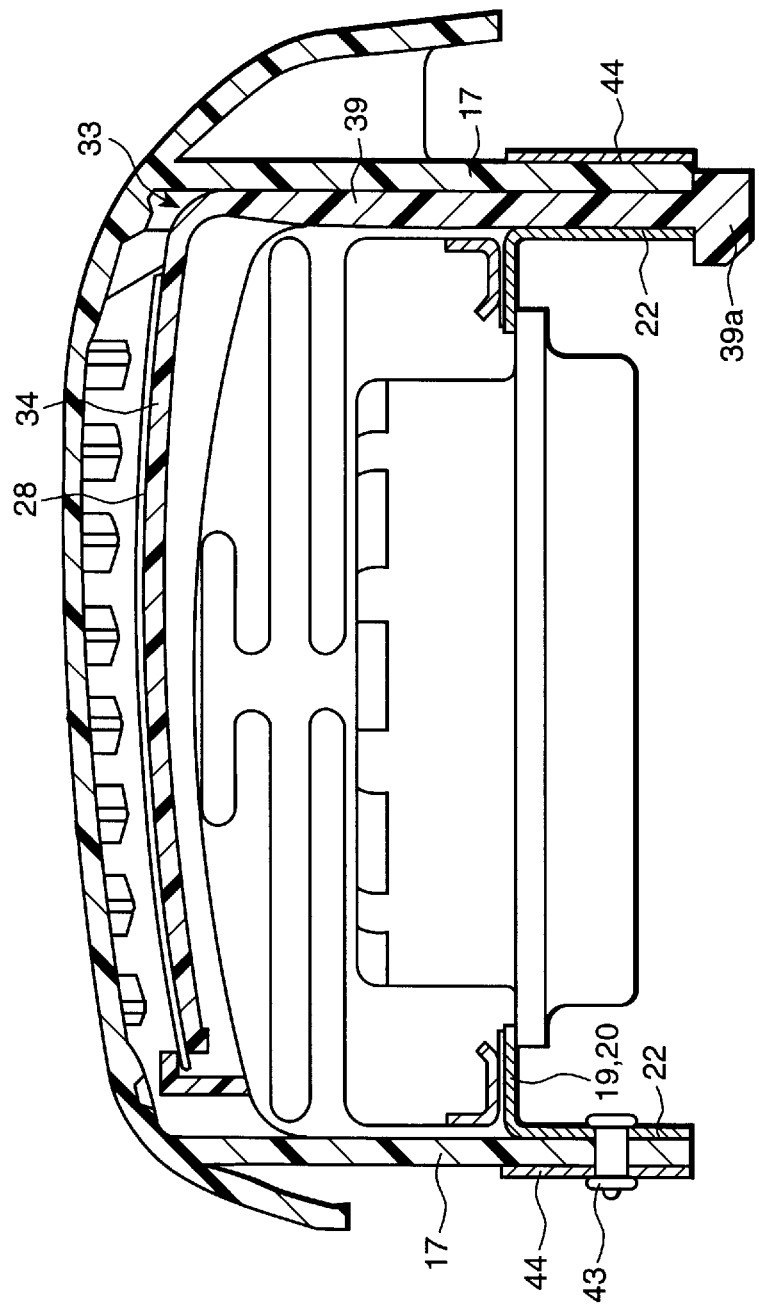
FIG. 18 is a sectional view of still another embodiment.

Incidentally, as shown by FIG. 18, the expanded portion 39a may remain a part of the attaching leg 39 of the support plate 33, and a hold plate 44 may be attached to the main body 20 of the bag holder 19 using the rivets 43. That is, a hold plate 44 having a substantially square cylindrical shape arranged around to the outer peripheral surface of the side wall 17 of the pad 9, may be fixed to the side wall 22 of the main body 20 of the bag holder 19 by utilizing the rivets 43. Also in this case, the hold plate 44 only serves to press the side wall 17 of the pad 9 against the side wall 22 of the bag holder 19. Thus, no more than four rivets 43 need be utilized in order to achieve proper operation and effect of the second air bag device.

Figure 19:
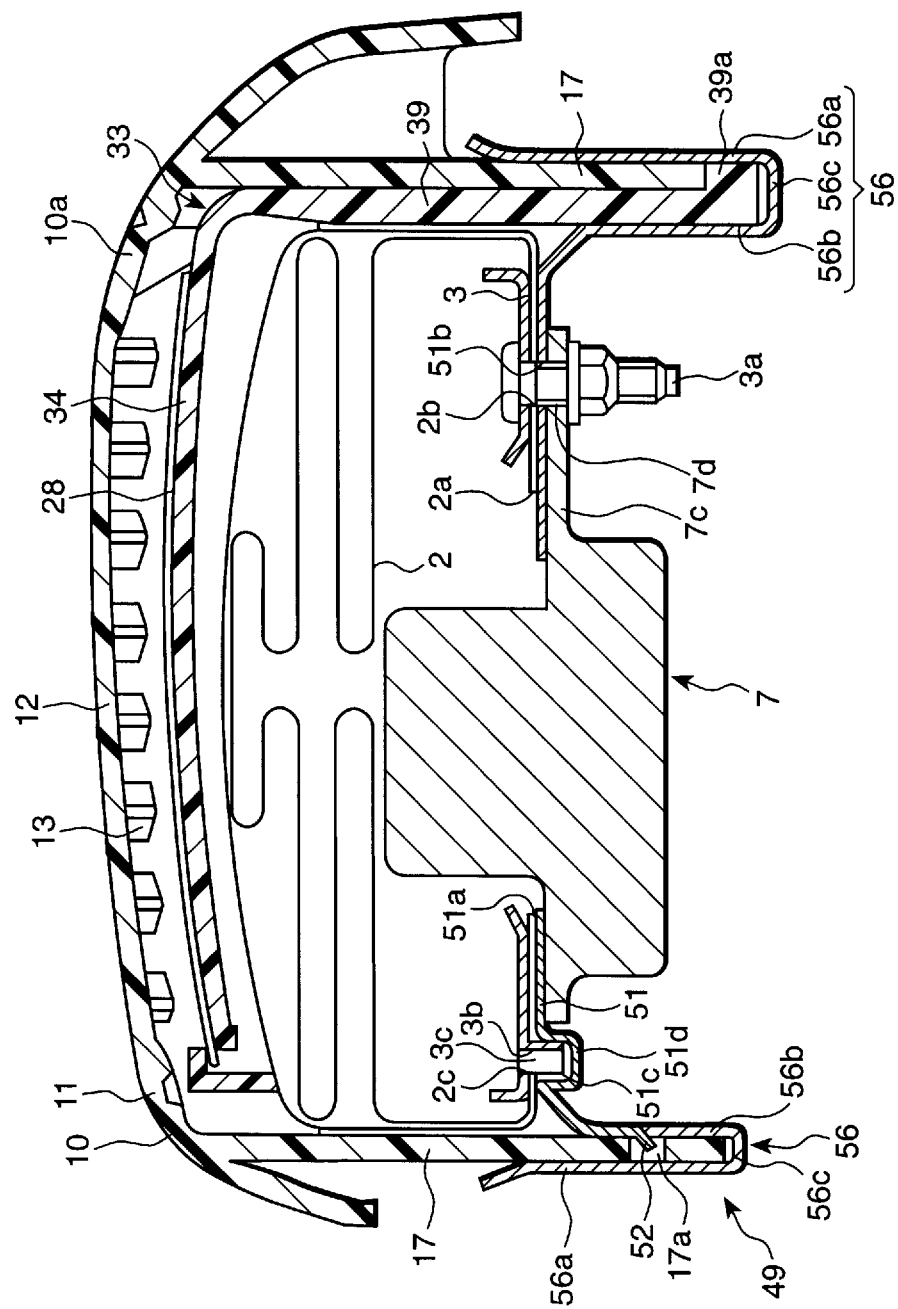
FIG. 19 is a sectional view of yet another embodiment, this embodiment having an integrated bag holder.

Further, in the illustrated embodiment, although the bag holder 19 includes two members, namely, the main body 20 and the hold plate 24, it is understood that an integrated bag holder 49, as illustrated by FIG. 19, may be used. The bag holder 49 comprises a main body 50 having a bottom wall 51 and a hold plate 54 arranged at the outer periphery of the bottom wall 51 and provided with a fitting position 56. The fitting position 56 comprises an outer peripheral wall 56a, an inner peripheral wall 56b and a connecting wall 56c for connecting the peripheral walls 56a and 56b. The outer peripheral wall 56a bears against the outer peripheral surface of the side wall 17. The inner peripheral wall 56b is provided with stopper claws 52 for engaging the peripheries of respective stopper holes 17a which are arranged on the inner periphery of the side wall 17 and the attaching leg 39. The respective claws 52 are bent after fitting the side wall 17 to the fitting portion 56.

Further, according to the air bag 1 of the illustrated embodiment, the prearranged rupture portion 11 located around the periphery of the door 12 in the top wall 10 of the pad 9 is ruptured upon expansion of the air bag 2. The side wall of the conventional inner cover, however, (air bag device disclosed in Japanese Unexamined Patent Publication No. JP-A-6-312664) is not ruptured. Therefore, with respect to the support plate 33, the selection of material and setting of dimensions of the support plate 33 are facilitated because the only serious considerations are achieving a desired amount of rigidity for attaching and supporting the horn switch 28 and achieving a desired amount of flexibility to permit opening of the air bag 2 during inflation thereof.

Furthermore, according to the air bag device 1 of the illustrated embodiment, when a gas for expansion is introduced from the opening 2a into the air bag 2 during expansion of the air bag 2 and a portion of the gas for expansion is about to pass through the work holes 3c of the retainer 3 and the stopper holes 18c of the main body 17 of the bag holder, the bottoms of the bottomed recesses 25c at the hold plate 24 of the bag holder 19 tightly close the work holes 3c and the stopper holes 21c. Accordingly, leakage of the gas for expansion is prevented and a time period for completing the expansion of the air bag 2 is not prolonged.

Further, according to the air bag device 1 of the embodiment, the bag holder 19 is constituted by the main body 20 and the hold plate 24. The depth of the recessed portions 25c of the hold plate 24 can be made shallower than in the case where the bag holder 19 is constituted by a single member, the depth being shallower by a distance corresponding to the depth of the stopper holes 21c of the main body 20. Accordingly, when the recessed portions 25c are formed by pressing, the working energy can be reduced. Further, both of the main body 20 and the hold plate 24 can be threadedly secured together by the bolts 3a which hold the air bag 2. Accordingly, even if the bag holder 19 is constituted by the illustrated two members, the number of steps necessary to assemble the air bag device 1 is not increased.

Incidentally, when the bag holder is constituted by a single member, as described above, it is preferably constituted as illustrated by FIG. 19. That is, an insertion hole 51a for receiving the main body 7a of the inflator 7, insertion holes 51b for receiving the respective bolts 3a of the retainer 3, and stopper recesses 51c having bottom plates 51d for engaging the respective stopper claws 3c of the retainer 3, are formed at the bottom wall 51 of the bag holder 49. Further, the fitting portion 56 for holding the side wall 17 of the pad 9 and the attaching leg 39 of the support plate may be formed around substantially the entire outer peripheral edge of the side wall 17.

Even with such a bag holder 49, the bottom plates 51d of the stopper recesses 51c tightly close the work holes 3c of the retainer 3 and therefore, leakage of a gas for expanding the air bag 2 can be prevented.

Further, in the illustrated embodiment, the bottom portions of the bottomed recesses 25c for closing the work holes 3c of the retainer 3, are constituted by the hold plate 24 per se. However, it is understood that penetrated stopper holes, for example, may be formed at the portions of the stopper recesses 51c of the bag holder 49, and bottom plates for closing the stopper holes may be provided by members having a cap-like shape that are fixed by welding or the like.

Furthermore, when the bottom plate portions for closing the stopper holes are provided to obtain the operation and effect of the third embodiment of the present invention, the fitting portion 26 may be dispensed with in the bag holder. Therefore, the side wall 17 of the pad 9 may be fixed to the bag holder by utilizing rivets.

Furthermore, although the bolts 3a have been exemplified as a fixing means extending from the retainer 3 in the embodiment, other rivets or the like may be used.

We claim:

1. An air bag device arranged on a steering wheel, said air bag device comprising an air bag, a pad, a bag holder, a horn switch and a support plate;

wherein the air bag is folded within the air bag device;

wherein the pad comprises a top wall portion and a side wall portion for covering the air bag when folded;

wherein the side wall portion is provided with a substantially cylindrical shape extending from an outer periphery of the top wall portion in a direction which is substantially perpendicular to the top wall portion and is held by the bag holder;

wherein the top wall portion includes a face and a door portion which is substantially coextensive with the face, said face being surrounded by the side wall portion;

wherein the door portion has an inside surface and a plurality of press projections for pressing the horn switch, said press projections being located on the inside surface of the door portion, said door portion being surrounded by a prearranged rupture portion;

wherein the door portion is arranged so as to open when the prearranged rupture portion is ruptured during expansion of the air bag;

wherein the bag holder holds the air bag, the pad and the support plate;

wherein the horn switch has a substantially thin plate shape which substantially matches a shape of the door portion and is arranged between the folded air bag and the pad;

wherein the support plate is arranged between the folded air bag and the pad is provided with a support portion and an attaching leg and is more rigid than the pad;

wherein the support portion is provided with a planar shape which substantially matches the shape of the door portion, said horn switch being attached to an outer surface of said support portion to engage and thereby support the horn switch via an inside surface of the horn switch;

wherein the attaching leg extends from the support portion along the side wall portion of the pad and is attached to the bag holder;

wherein positioning recesses and positioning projections for mutually engaging with each other are formed at the support portion of the support plate and the door portion of the pad; and wherein supporting projections are formed between the support portion of the support plate and the door portion of the pad to maintain a predetermined amount of space between the support portion and the inside surface of the door portion.

2. An air bag device according to claim 1;

wherein said side wall portion has a plurality of stopper holes;

wherein the door portion is surrounded by a prearranged rupture portion and is arranged so as to open when the prearranged rupture portion is ruptured during expansion of the air bag;

wherein the bag holder includes a main body portion and a hold plate portion and holds the air bag, the pad and the support plate;

wherein the main body portion includes a side wall arranged inside the side wall portion of the pad;

wherein the side wall of the main body is provided with stopper claws for engaging peripheries of the stopper holes when inserted into respective ones of the stopper holes;

wherein the hold plate portion includes a region which extends around an outer peripheral surface of the side wall portion of the pad when the respective stopper claws of the main body portion are inserted into the respective ones of the stopper holes of the side wall portion of the pad;

wherein the attaching leg is provided with an expanded portion at a distal end thereof; and wherein the attaching leg is arranged between the side wall portion of the pad and the side wall of the main body portion of the bag holder and is attached to the bag holder such that the attaching leg projects around at least one of an edge of said side wall portion of the pad or an edge of the side wall of the main body of the bag holder such that the expanded portion serves as a detachment preventive member.

3. An air bag device arranged at a steering wheel, said device comprising an air bag, a pad, a bag holder, a horn switch and a support plate;

wherein the air bag is folded with in the air bag device;

wherein the pad comprises a top wall portion and a side wall portion for covering the air bag when folded;

wherein the side wall portion is held by the bag holder and is provided with a substantially cylindrical shape extending from an outer periphery of the top wall portion in a direction which is substantially perpendicular to the top wall portion, said side wall portion having a plurality of stopper holes;

wherein the top wall portion includes a face and a door portion which is substantially coextensive with the face, said face being surrounded by the side wall portion;

wherein the door portion is surrounded by a prearranged rupture portion and is arranged so as to open when the prearranged rupture portion is ruptured during expansion of the air bag;

wherein the bag holder includes a main body portion and a hold plate portion and holds the air bag, the pad and the support plate;

wherein the main body portion includes a side wall arranged inside the side wall portion of the pad;

wherein the side wall of the main body is provided with stopper claws for engaging peripheries of the stopper holes when inserted into respective ones of the stopper holes;

wherein the hold plate portion includes a region which extends around an outer peripheral surface of the side wall portion of the pad when the respective stopper claws of the main body portion are inserted into the respective ones of the stopper holes of the side wall portion of the pad;

wherein the horn switch has a substantially thin plate shape and is arranged between the folded air bag and the pad;

wherein the support plate is arranged between the folded air bag and the pad is provided with a support portion and an attaching leg and is more rigid than the pad;

wherein the horn switch is attached to an outer surface of the support portion;

wherein the attaching leg extends from the support portion along the side wall portion of the pad and is provided with an expanded portion at a distal end thereof; and wherein the attaching leg is arranged between the side wall portion of the pad and the side wall of the main body portion of the bag holder and is attached to the bag holder such that the attaching leg projects around at least one of an edge of said side wall portion of the pad or an edge of the side wall of the main body of the bag holder such that the expanded portion serves as a detachment preventive member.

4. An air bag device comprising an air bag, a retainer, a bag holder, and bottom plate portions;

wherein the air bag is provided with an opening portion receiving a gas during expansion;

wherein the retainer is arranged inside the air bag at a periphery of the opening portion and is provided with a plurality of fixing means and stopper claws;

wherein the fixing means are inserted through the air bag at the periphery of the opening portion of the air bag and through the bag holder such that the periphery of the opening portion of the air bag is held between the retainer and the bag holder whereby the retainer is fixed to the bag holder;

wherein the retainer includes a work hole adjacent to each of the stopper claws, said stopper claws being formed by cutting and raising a piece of the retainer, each stopper claw being insertable through a periphery of the opening of the air bag and the bag holder;

wherein the bag holder is provided with through holes for receiving the fixing means and is provided with stopper recesses, each of said stopper recesses having a periphery which is engaged by a respective one of the stopper claws when said stopper claws are received in the stopper recesses; and wherein the bottom plate portions are arranged at respective bottoms of the stopper recesses to close each of the stopper recesses.

5. The air bag device according to claim 4;

wherein the bag holder includes a main body portion and a hold plate portion;

wherein the main body portion and the hold plate portion hold a side wall portion of the pad extending from a top wall portion thereof which covers the folded air bag;

wherein the main body portion is provided with through holes for receiving the fixing means and the stopper holes which align with the stopper recesses and have a periphery which engages respective ones of the stopper claws; and wherein the hold plate portion also includes through holes for receiving the fixing means to integrate with the main body portion and the bottom plate portions which close the stopper holes.

* * * * *